United States Patent

[11] 3,564,328

| [72] | Inventors | Rodney D. Bagley<br>Corning;<br>Edwin J. Force, Big Flats, N.Y. |
|---|---|---|
| [21] | Appl. No. | 748,516 |
| [22] | Filed | July 29, 1968<br>Continuation-in-part of Ser. No. 730,010, May 17, 1968, abandoned. |
| [45] | Patented | Feb. 16, 1971 |
| [73] | Assignee | Corning Glass Works<br>Corning, N.Y. |

[54] CERAMIC ARTICLES AND METHOD OF FABRICATION
19 Claims, 7 Drawing Figs.

[52] U.S. Cl. .................................................. 313/220,
65/36, 156/89, 264/57, 313/221
[51] Int. Cl. ..................................................... C03b 23/20,
H01j 61/30
[50] Field of Search ........................................... 313/220,
221; 264/57 (Digest), (Inquired); 65/33, 36, 43,
(Inquired); 174/50.61; 156/84, 89; 106/(Inquired)

[56] References Cited
UNITED STATES PATENTS

| 1,456,960 | 5/1923 | Austin | 65/43X |
| 3,184,370 | 5/1965 | Luks | 65/33X |
| 3,192,086 | 6/1965 | Gyurk | 156/89 |
| 3,239,322 | 3/1966 | Carter | 65/43X |
| 3,239,323 | 3/1966 | Folweiler | 65/43X |
| 3,346,357 | 10/1967 | Baak | 65/33 |
| 3,363,133 | 1/1968 | Harris et al. | 313/221X |
| 3,363,134 | 1/1968 | Johnson | 313/220 |
| 3,416,980 | 12/1968 | Cahen et al. | 156/89 |

*Primary Examiner*—Roy Lake
*Assistant Examiner*—Palmer C. Demeo
*Attorneys*—Clarence R. Patty, Jr. and Richard N. Wardell ABSTRACT: Method of forming gas tight seals between polycrystalline ceramic bodies without a sealant material. Method, which is useful for joining sections of ceramic tubing in gastight relationship and for providing gastight seals for tubular bodies, depends on differing degrees of firing shrinkage of the components being joined, their ability to sinter together, and on the fact that the components, when fired, have substantially the same coefficient of thermal expansion. Various means of providing for differential firing shrinkages, such as a polycrystalline ceramic tube fired to near theoretical density is inserted in closely fitted relationship into a green tubular body of the same composition and the assembly is fired until both components are of maximum density. Sintering and shrinkage of the outer tubular body onto the inner body produces a monolithic structure with a completely continuous crystal structure across and replacing the former physical contact boundary. Ceramic articles, such as gas discharge lamp structures, embodying tubular ceramic bodies having end closures made by described method.

CERAMIC ARTICLES AND METHOD OF FABRICATION

CROSS-REFERENCE TO RELATED APPLICATION

This is a continuation-in-part of application Ser. No. 730,010, filed May 17, 1968, now abandoned.

BACKGROUND OF THE INVENTION

1. Field of the Invention

The method of the present invention pertains to the sealing together of polycrystalline ceramic bodies without the use of a sealant material and without the aid of externally applied pressure. The sealing is accomplished during a sintering operation in which a first body is shrunk around a second body which exhibits a significantly smaller degree of firing shrinkage than the first body. In the process, the bodies sinter directly together into a monolithic structure.

While not limited thereto, the method is of utility in the production of gas discharge lamp envelopes.

2. Description of the Prior Art

Various methods are known, particularly in the ceramic lampmaking art, for providing gastight seals for ceramic tubes and for joining sections of such tubes. Possibly the most common of these methods involve the use of metal sealing or joining members which may take several forms. Representatively, a metal cap may be fitted over an end of a tube, with the skirt portion of the cap extending a reasonable distance along the tube so as to provide a sufficient sealing area. This expedient presents several major problems. First, it is virtually impossible to provide a metal cap having a coefficient of thermal expansion identical to that of the ceramic tube; an approximate match of such coefficients is the best that can be hoped for. Secondly, the cap must fit snugly over the tube end. This necessitates careful and accurate machining of both tube end and the inner surface of the skirt portion or the cap. Finally, the ceramic-to-metal interface must be provided with a thin sealant layer, an additional step in the process of assembling the seal.

A metal seal may, of course, take the form of a disc bonded to the end of the tube by a thin sealant layer. In this case also, the disc must be machined to be as smooth and flat as possible, as must the end of the tube to which it is to be bonded. Because the area of metal-to-ceramic contact is limited to the area of the end of the tube, it is more difficult to achieve a hermetic seal with a disc seal than with a cap seal.

Obviously, all of the difficulties described above are met with if metal-to-ceramic sealing is resorted to for the purpose of joining the ends of two ceramic tubes. If the ends of two tubes are inserted into a metal sleeve and sealed to the inner surface thereof, all of the problems of cap sealing must be considered. If an attempt be made to join two ceramic tubes by means of sealing an end of each tube to opposite sides of a metal washer, the above-mentioned limited metal-to-ceramic sealing area in disc sealing is pertinent, both in regard to achieving a hermetic seal on both sides of the washer and in regard to the mechanical strength of the seal; an assemblage of tubes thus joined has quite limited resistance to breakage under flexural stress.

A ceramic tube may also be provided with ceramic disc closures. A disc, of the same material as the tube, is prepared, fired and ground flat. The end of the fired tube is also ground flat. That portion of the disc that is to mate with the tube end is provided with a thin, continuous layer of finely divided powder having a composition corresponding to composition of the tube and disc. Tube and disc are then placed in abutting relationship. A pressure of about 1,000 p.s.i. is then exerted on the disc to insure its intimate contact with the end of the tube. This pressure is maintained during firing to fuse the powder sealant and to bond the components into a monolithic structure. As is apparent, this method requires careful preparation of the mating surfaces and the use of proper equipment to maintain the assemblage under pressure during firing. This latter consideration requires the construction of special furnaces or the inconvenient and expensive adaptation of existing furnaces.

Polycrystalline ceramic disc closure members may be sealed to a tube of polycrystalline ceramic material by the use of a sealant other than the finely divided powder having a composition corresponding to the composition of tube and closure member. For example, sealing glasses having suitably low flow or melting points may be employed. A slurry of finely divided sealing glass in a suitable vehicle is painted on the mating surfaces of the tube and closure member. These latter are assembled and the assembly is fired to effect a bond between the components. The thus bonded assembly is not, of course, a monolithic structure. Hence, the upper limit of use temperature of the assembly is not determined by the polycrystalline ceramic material but by the sealing glass.

SUMMARY OF THE INVENTION

This invention relates to a method of joining polycrystalline ceramic bodies to form a monolithic structure. More particularly, it relates to a method of joining polycrystalline ceramic bodies, in hermetically sealed relationship, by shrinking, during sintering, of one body around and onto another, the outer body being in annular relationship to the body around which it is shrunk, and exhibiting a greater degree of firing shrinkage than the latter body. Most specifically, the invention has to do with a method of providing closures for tubular polycrystalline ceramic bodies and for sealing sections of tubular polycrystalline ceramic bodies together, particularly in hermetic relationship. Lastly, the invention relates to gas discharge lamps, the tubular envelope portions of which are provided with end closure members by the method described.

The method of the invention does not call for extreme precision in the preparation of the ceramic components to be joined, the use of sealant material between the ceramic components or the maintaining of externally applied pressure during the combining or joining operation. Since the method minimizes the need for meticulous manipulation of the work pieces, it is adapted to volume production of desired monolithic structures, such as sealed tubes, end-to-end joined tubes and the like.

There are a number of ways available to provide for significantly different rates of shrinkage of the tube and of the closure members on firing. Certain of these are briefly described in the numbered paragraphs immediately following:

1. Different forms of the ceramic material may be employed. A green body pressed from gamma alumina, for example, typically will shrink on firing to a greater extent than will a green body pressed from alpha alumina. Two factors contribute to the greater firing shrinkage of the gamma form. First, gamma alumina undergoes irreversible conversion, at about 1150° C., to the alpha form, the conversion being attended by an increase in density. Secondly, gamma alumina is usually very fine and does not pack to a high green density because of bridging and clustering.

It will be apparent, therefore, that when the closure member is a cap placed over the end of a tube, the green tube may advantageously be formed from alpha alumina while the green cap will be formed from gamma alumina.

Obviously, if the closure member is a plug, it will be fabricated from the alpha form while the material of construction of the tube will be gamma alumina.

In the above-described method, as in the methods described in succeeding paragraphs 2 and 3, the green tube is fitted with a green closure member and the whole is fired to sintering temperature.

2. In this method, the same form of the material is employed in the preparation of both of the green bodies. However, it is employed as two separate fractions of significantly different particle size. At the same forming pressure, a fine particle size alpha alumina, for example, gives rise to a body of lower green density (higher firing shrinkage) than does the material having a wider particle size distribution and containing relatively coarse material. Therefore, if the closure member is a cap, a relatively fine material would be employed to form the green cap, while coarser material would be used to form the green tube body. When a plug closure is desired, the reverse choice is made.

3. This method is merely a variant of that immediately preceding. One ceramic material is employed and bodies of differing green densities are obtained by employing different forming pressures. As will be understood, the higher the forming pressure, the greater will be the green density of the formed body, and the smaller its firing shrinkage.

4. As a departure from the above-described methods, this method involves two firings. Thus, a green plug closure may be fired to the extent that partial shrinkage occurs; the shrinkage should be such that the fired plug fits closely into the green tube body. The assembly is then fired to maximum density. Obviously the green tube shrinks to a greater extent than the partially shrunken plug.

In this latter method, the prefired member should not be prefired at a temperature high enough and for a sufficient period of time that leads to large grain size. If the grain size is too large, good sintering will not occur between the bodies being joined, i.e., there may be insufficient grain boundary movement to remove the pores at the junction. The prefired body need only be prefired to the extent that the desired shrinkage mismatch will occur.

It is a particular feature of the invention that no sealant material is employed in the formation of the bond between the ceramic components. Nevertheless, mechanically strong, hermetic seals are readily obtained.

It is another feature of the invention that no external pressure is exerted on the components being joined. Only the pressure during sintering exerted by the component having the greater shrinkage on the other is involved in the formation of the bond.

It is to be noted that the firing induced shrinkage of one component is restricted to much less than its normal value by the restraining action of the component exhibiting the lesser degree of shrinkage. Heretofore, it would have been reasonably expected that the strains set up in the component exhibiting the greater shrinkage would lead to its physical failure, as by tearing or cracking. This is not observed. Thus, a close fitting fully fired plug may be inserted into a green alumina tube and the assembly fired without failure of the tube at the point or area of total restriction. This occurs although a typical tube of fine alpha alumina would normally exhibit about 23 percent linear shrinkage during sintering.

It is apparent that the upper use temperature of ceramic bodies sealed according to the present method is that of the ceramic material itself since no foreign sealing material is employed.

As indicated, the invention is also concerned with gas discharge lamps embodying polycrystalline ceramic tubular bodies provided with end closure members according to the above-described method, a use for which such bodies are particularly suitable. The fabrication of such lamps, to be more fully described hereinafter, involves providing centrally disposed apertures in the closure members communicating with the interior of the tubular body. Electrical lead-ins carrying electrodes at one end thereof are passed into and through these apertures so that the electrode is positioned interiorly and centrally in the tubular body. The electrical lead-ins or electrode support members are hermetically sealed by a layer of sealant glass or metal to the walls of the aperture. At least one of these lead-ins is tubular in form, thereby providing means for exhausting air from the lamp and for introducing inert gas and light emitting materials into the lamp. This tubular lead-in is, of course, hermetically sealed in the completed lamp.

BRIEF DESCRIPTION OF THE DRAWINGS

In FIGS. 1 to 4 inclusive, the closure members, plugs or caps 2 and 5 are shown provided with apertures 3 and 6, respectively, therethrough because of the particular utility of the articles shown as envelopes for high temperature and high-pressure gaseous discharge lamps and high temperature metal vapor lamps. For this use, of course, completely fired, closed tubes (FIGS. 2 and 4) are required. Electrode assemblies coated with a sealant frit are fitted into the apertures. The tube thus fitted is refired to fuse the sealant to provide a hermetic seal of ceramic to metal in known manner, as described, for example, in U.S. Pat. No. 3,243,635. However, it will be understood that, for other purposes, the closure members may be solid bodies.

Referring to FIG. 1, the green ceramic tube 1 is provided with sintered plugs 2 inserted in the ends thereof. These plugs are approximately cylindrical although they display a slight convexity in axial cross section. This configuration gives an optimum seal; maximum contact between the plug and the inner wall of the tube is achieved on the shrinkage of the latter.

In FIG. 2, the intimacy of contact between the plugs 2 and the sintered, shrunken tube 1 is indicated.

In FIG. 3, the skirt portions 7 of the green caps 5 embraces the ends of the sintered tube 4. The length of the skirt portions 7 is not critical, but is should be sufficient to give a somewhat extended sealing area between tube and cap.

In FIG. 4, the caps 5 have been sintered and the skirt portions 7 are gas-tightly sealed to the end portions.

In FIG. 5 the internal diameter of the central portion of sintered tube section 10 is shown equal to that of tube sections 8 and 12 over substantially all of its length. This condition results if sintered tubes 8 and 12, in the green state prior to sintering are of the same internal diameter as tube 10 in its green state. The length of the telescoped end sections 9 and 11 of tube 10 is not critical but should be such as to give a substantial sealing area between tube 10 and tubes 8 and 12.

In FIGS. 2, 4, 6 and 7 of the accompanying drawings, which illustrate completely fired structures, the broken lines $b$ indicate the apparent boundary between component ceramic parts of the various assemblies. However, it will be understood that there is no discontinuity between the parts. Photomicroscopic examination of the end of a specimen obtained by cutting through the skirt portion 7 and the tube 4 embraced thereby in FIG. 4, for example, reveals a completely continuous crystal structure across this boundary.

Figure 1:
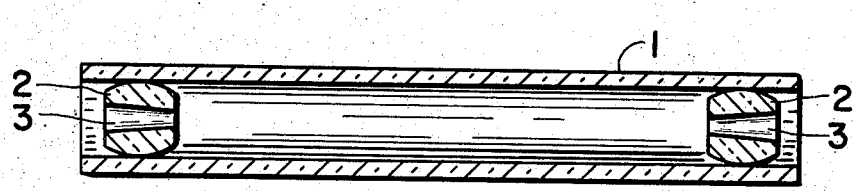
FIG. 1 is a cross-sectional view of a green tubular ceramic body having sintered ceramic plug members positioned interiorly near the ends thereof.

In the foregoing discussion of the drawings, it was indicated that one member or pair of members in each case was nearly completely sintered and that the shrinkable member or members was a totally unfired green body. It will be understood, however, that these are not necessary conditions. It is only necessary that there be a substantial difference in the degree of firing shrinkage exhibited by the members forming the seal. Thus, in FIG. 1, for example, both tube and plugs may be partially fired to different degrees so that the tube, on the firing of the assembly of tube and plugs, shrinks to a significantly greater extent than do the plugs.

DESCRIPTION OF THE PREFERRED EMBODIMENTS

In the following nonlimiting examples, aluminas containing 0.12 weight percent magnesia were employed as the polycrystalline ceramic raw materials. It will be understood, however, that the method is applicable to a wide variety of sinterable materials, such as magnesia, magnesium aluminate spinel and the like.

EXAMPLE 1

Figure 3:
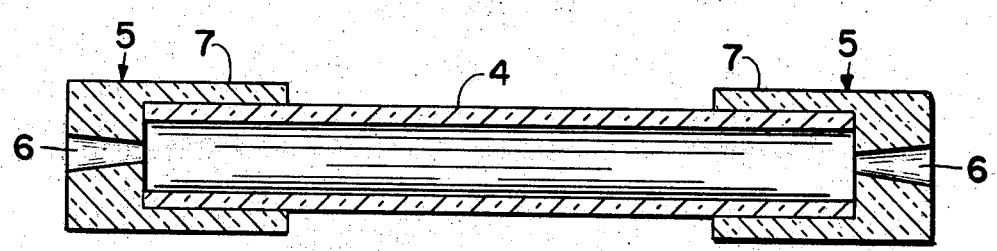
FIG. 3 is a cross-sectional view of a sintered tubular ceramic body, the ends of which are fitted with green ceramic caps.

By isostatic pressing at 20,000 p.s.i., a tube (4 in FIG. 3) was formed from an alpha alumina material having an average particle size of about 0.3 micron diameter. A rod was isostatically pressed from a gamma alumina material of significantly smaller average particle size than that used to prepare the tube, i.e. about 0.05 micron. Both the rod and tube were fired at 1,000° C. to burn out binder and to enhance their strength, although little shrinkage occurs at 1,00° C. A section of the rod, which had a length of 0.840 in. and an outside diameter of 0.593 in. was center drilled with a carbide bit to give a cap (5 in FIG. 3) having an inside diameter of 0.495 in. The length of the skirt portion (7 in FIG. 3) was 0.425 in. The cap was fitted over an end of the tube, which had an outside diameter of 0.491 in. and an inside diameter of 0.403 in. The resulting assembly was then fired for 3 hours at 1850° C. The cap shrank to the configuration shown in FIG. 4. A sample of the rod from which the cap was fabricated, fired with the assembly, shrank 31 percent while the tube shrank 24.2 percent. Testing with a helium leak detector proved the tube-to-cap seal to be hermetic.

EXAMPLE 2

In the manner above described, a tube and cap were prepared from the same finely divided alpha alumina which had an average particle size of 0.5 micron. The plug for making the cap was prefired at 1,100° C. (no hold period) to strengthen it for drilling. The cap had an outside diameter of 0.500 in. and an inside diameter of 0.410 in.; its skirt portion was 0.475 in. long. The tube was fired for 1 hour at 1,600° C. in vacuum to near theoretical density. After firing, the tube had an outside diameter of 0.375 in. and an inside diameter of 0.305 in. The cap was then fitted over an end of the fired tube and the assembled unit was fired at 1,850° C. for 1 hour. A piece of the rod from which the cap had been made was fired at the same time and was found to have shrunk 21.2 percent. No significant further shrinkage was exhibited by the tube portion. Helium leak detector testing proved a hermetic seal to have been formed.

EXAMPLE 3

A tube (1 in FIG. 1) of alpha alumina was formed by the isostatic pressing at 20,000 p.s.i. of an alumina powder having an average particle size of 0.3 micron. A disc-shaped plug (2 in FIG. 1) was formed at the same pressure from an alpha alumina having a median particle size of 1.55 microns and a particle size distribution as shown in table I.

TABLE I

| Diameter, Microns | Weight Percentage Under Size |
|---|---|
| 20 | 100 |
| 10 | 97 |
| 8 | 93 |
| 6.6 | 86 |
| 4 | 75 |
| 2 | 56 |
| 1 | 41 |
| 0.8 | 37 |
| 0.6 | 30 |
| 0.4 | 20 |
| 0.3 | 8 |

By virtue of this particle size distribution, the alumina from which the plug was formed expectedly exhibited greater packing efficiency than that used in fabricating the tube. The plug had a diameter of 0.401 in. and was about 0.2 in. thick. The edges of the plug were rounded off so that in axial cross section it displayed a flattened barrel shape. The plug was then inserted in the tube, which had an outside diameter of 0.491 in. and an inside diameter of 0.403 in., and the assembled unit was fired in vacuum for 1 hour at 1,850° C. It was found that the plug shrank 11.6 percent while the tube shrank 23.8 percent. A hermetic seal was obtained.

It will be understood that, in the foregoing examples, the closure members 2 and 5 were not provided with the apertures designated either 3 or 6 in FIGS. 1—4 inclusive.

Figure 6:
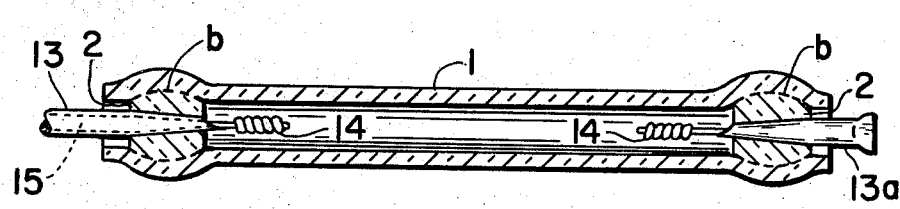
FIG. 6 is a cross-sectional view of a gas discharge lamp in which the envelope and closure members are those shown in FIG. 2.

Referring now to FIG. 6, the lamp shown comprises an envelope 1 of sintered, translucent ceramic oxide material such as polycrystalline alumina. Disposed at either end of this envelope 1 are apertured closure members 2 in the form of plugs of the sintered ceramic material which are monolithically and hermetically bonded to the inner wall of envelope 1 along the apparent boundary b. Electrically conductive electrode support members 13 and 13a are embraced by closure members 2 and are hermetically bonded to the wall of the aperture through said closure members by a sealant layer therebetween. Electrode support member 13 is shown as a tubular member having a passageway or bore 15 communicating with the space within envelope 1, whereby, in known manner, the envelope may be evacuated and inert, ionizable, starting gas (e.g. argon, xenon or krypton) and vaporizable light-emitting substance, such as active metals and active metal halides, may be introduced into the envelope. Representative of useful light-emitting substances are particular alkali metals, sodium, lithium and cesium, alkaline earth metals such as calcium, strontium and barium as well as scandium, gallium, indium, thallium, mercury and zinc and the halides of the named metals. Electrode support member 13a is essentially identical to its counterpart 13 except that its exterior end is hermetically sealed as by a so-called pinch seal or pressure weld, as shown. Electrodes 14 are mounted on the ends of their support members 13 and 13a and are positioned near the ends of envelope 1 interiorly and centrally thereof.

Figure 2:
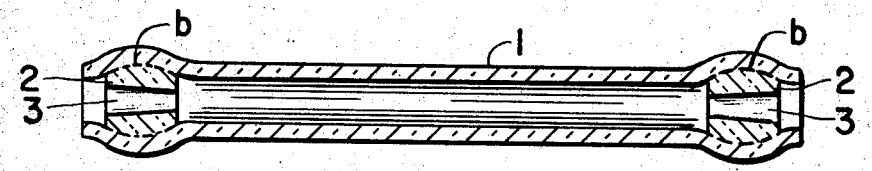
FIG. 2 is a cross-sectional view of the tubular body obtained by firing the assembly depicted in FIG. 1.

It is readily apparent that the lamp shown in FIG. 6 embodies the ceramic structure of FIG. 2. Similarly, the lamp shown in FIG. 7 embodies the ceramic structure of FIG. 4.

Figure 7:
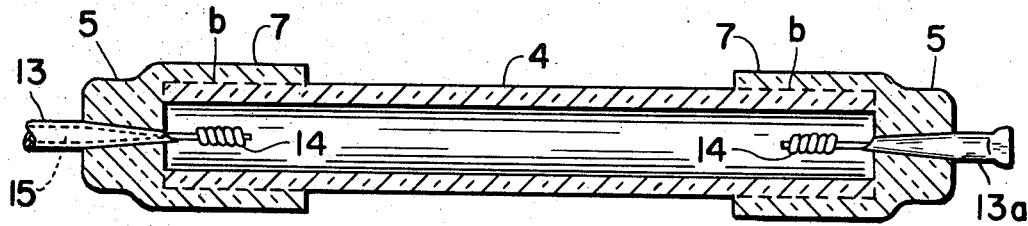
FIG. 7 is a cross-sectional view of a gas discharge lamp in which the envelope and closure members are those shown in FIG. 4.

In FIG. 7 the end portions of envelope 4 of sintered, translucent ceramic material are hermetically and monolithically bonded along the apparent boundary b to apertured, cap-shaped closure members 5 having skirt portions 7 embracive of the said end portions. Except for the different shape and disposition of their closure members 2 and 5, the lamps of FIGS. 6 and 7 are comparable and the function of like numbered elements in each figure are identical.

In both FIG. 6 and FIG. 7 only working electrodes 14 are shown. However, it will be understood that an additional aperture may be provided in either plug or cap closure member to provide for the placement of a starting electrode adjacent to and electrically insulated from a working electrode 14.

Figure 4:
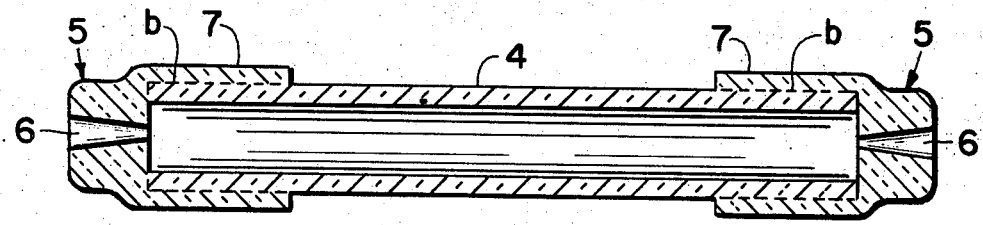
FIG. 4 is a cross-sectional view of the tubular body obtained by firing the assembly depicted in FIG. 3.
Figure 5:
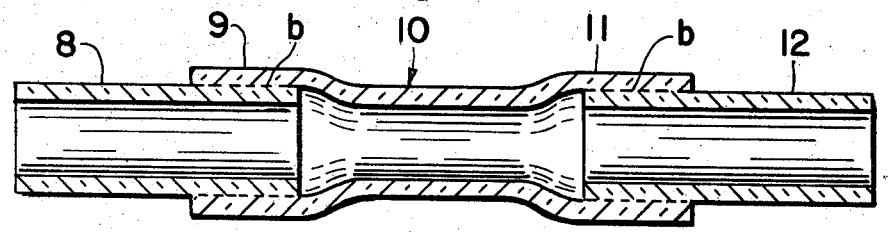
FIG. 5 is a cross-sectional view of an elongated tubular structure obtained by inserting sintered ceramic tubes into opposite ends of a green ceramic tube and firing the resulting assembly.

The apertures 3 and 6 in closure members 2 and 5 in FIGS. 2 and 4 respectively, adapted to receive electrode support members 13 and 13a in FIGS. 6 and 7 may be formed in several ways and may be either cylindrical or tapered, as depicted. They may be drilled in the closure when the latter is in the green state, due consideration being given to the expected shrinking or firing, after which the body is fired. A cylindrical aperture thus formed is ordinarily ready for sealing. In the case of a tapered aperture in the fired closure member, it is desirable to dress the wall thereof to insure the maximum of even contact of the wall with the mating tapered electrode support to be inserted therein. Alternatively, a green closure member may be provided with a cylindrical aperture of such size that, after firing, the aperture will have a diameter slightly smaller than the narrowest diameter of the desired tapered aperture. Thereafter, this cylindrical aperture is formed into a tapered aperture, by grinding with a properly tapered forming tool. This method minimizes the amount of material to be removed by grinding and consequently saves considerable labor.

It will be understood that the apertures may also be formed by drilling or grinding through the fired closure members, if desired. However, because of the hardness of the fired ceramic material, this is more difficult and time consuming than conducting the same operation on the softer green body material. The possibility of increased reject rate because of breakage is also enhanced and, obviously, the rejection of a fired body entails greater expense than the rejection of a green body.

The electrode support members may be completely cylindrical. However, it is preferred that that portion of the support member positioned within the aperture in the closure member be somewhat tapered as is the case with electrode support members 13 and 13a in FIGS. 6 and 7. The apertures (3 and 6 of FIGS. 2 and 4 respectively) are, of course, correspondingly tapered. This tapered configuration of the aperture and of the electrode support member to be contained therein simplifies the task of positioning the electrode centrally within the lamp envelope. Furthermore, this configuration aids in the forming of an excellent seal between the closure member and the electrode support member with the minimum of sealant. In making the seal, one or both of the surfaces involved, the wall of the aperture and the external surface of the tapered portion of the electrode support member, are provided with a coating of sealant by the application thereto of a slurry of finely ground sealant in an appropriate liquid vehicle. The support member is then inserted, in close fitting relationship, into the aperture in the closure member and the resulting assembly is placed in the furnace. Means are provided for exerting pressure on the outer end of the support member in the direction of the longitudinal axes of the support member and of the tubular lamp envelope. It is evident that as the sealant softens on heating the pressure will be effective to urge the tapered end of the support member into closer mating contact with the wall of the tapered aperture. As a result, the heat plastified sealant will be forced out, in large measure, from the conically annular zone defined by the mating surfaces, leaving behind a sealant layer of desirably minimum thickness. Only moderate pressure is required to achieve this result. It will be understood, of course, that reactive metal alloy seals may be formed, in known manner rather than seals embodying a sealant glass.

If desired, the sealant material need not be applied so as to completely coat the aperture wall of the closure member and the surface of the electrode support member. Sealant may be omitted from these surfaces near the narrow ends thereof. When the assembly is fired, the application of pressure to the support member as above described will cause the heat plastified sealant to flow both toward the narrow and wide ends of the conically annular sealing zone. By routine experiment, the amount of sealant employed and the extent of the narrower surfaces from which it is omitted can be determined so as to insure that, while all of the sealing zone will be provided with sealant, little or no sealant will be extruded, under pressure, around that portion of the support member inside the lamp envelope.

It will be understood, of course, that the sealing of the tapered electrode support members in the closure apertures may be effected without the application of pressure. sealant is applied to the parts to be joined, the electrode support member is inserted into the aperture and snugly seated therein, after which the assembly is fired at a temperature and for a time effective to fuse the sealant.

A particular advantage of the use of the ceramic closures of the present invention over the use of metal cap or disc closures is to be noted in lamps containing metals such as sodium or mercury. When such a lamp is deenergized, its subsequent cooling causes condensation of the metal, which may readily collect in droplets which are in contact both with the ceramic tube and with the metal seal. When the lamp is restarted, the condensed metal can become, in effect, an electrode surface; since it is in electric contact with the electrode support through the metal seal. Because of the low work function of the metal, the arc may be struck between an electrode and a droplet of metal touching the tube wall rather than between the two electrodes. The heat resulting from the arc-induced vaporization of the droplet is, of course, localized and may be sufficient to cause thermal shock rupture of the thin-walled ceramic tube adjacent the droplet. In a lamp according to the present invention a condensed droplet of metal in contact with both tube wall and closure member is in contact only with ceramic material; it cannot be in electric contact with the electrode support member. Accordingly, lamp failure from the above-described cause is obviated.

Obviously, the sealant for bonding the electrode support members to the aperture walls, the inert gas and light-emitting materials constituting the lamp fill and the metal or metals from which the electrodes and the electrode support members are fabricated are matters of the lamp makers choice and are somewhat interrelated. Thus, for example, if the lamp fill contains an active metal halide, niobium would not be chosen as the material from which to manufacture the electrode support members since it does not possess the necessary resistance to the corrosive action of these halides and, of course, the inner surface of the tubular support member communicates with the interior of the lamp.

Representatively, the lamp tubular body portion and the closure members will be fabricated from alumina. If the electrode support member is niobium, the sealant may be a glass consisting of $Al_2O_3$ (49 percent), $CaO$ (45 percent) and $MgO$ (6 percent). The electrodes are preferably of tungsten. An acceptable fill for this lamp is sodium, mercury and an inert gas, for example, krypton.

We claim:

1. The method of producing a monolithic polycrystalline ceramic body from at least two component members formed of sinterable polycrystalline ceramic material, at least one of said members being a tubular body, said method comprising:
    providing at least another one of said members having;
        essentially the same coefficient of thermal expansion when sintered as that of said tubular body when sintered,
        an external circumferential surface portion that closely fits an internal circumferential surface portion of said tubular body, and
        a firing shrinkage substantially less than that of said tubular body to cause said surfaces to firmly and intimately contact each other with pressure developed therebetween when assembled in circumferentially contiguous telescoped relationship and when the so assembled members are fired to the sintering temperature of said material,
    assembling directly together said members with said surfaces in said relationship; and
    firing said assembled members to said temperature to effect sintering thereof with development of said shrinkage and of said resulting contact of said surfaces, and to contemporaneously effect sintering together of said contacting surfaces with development of a completely continuous crystal structure across and that replaces the former physical contact boundary therebetween.

2. The method of claim 1 wherein said lesser shrinkage of said another one member is sufficient to effect a restraining action by said another one member on the shrinkage of said portion of said tubular body during said firing accompanied by the development of a bulged-out configuration in said portion of said tubular body.

3. The method of claim 1 wherein said polycrystalline ceramic consists essentially of polycrystalline ceramic oxide.

4. The method of claim 3 wherein said oxide is alpha alumina.

5. The method of claim 1 wherein said another one member is a barrel-shaped plug and said portion of said tubular body is axially adjacent to an end thereof.

6. The method of claim 1 wherein:
said polycrystalline ceramic consists essentially of alpha alumina;
said another one member is a barrel-shaped plug and said portion of said tubular body is axially adjacent to an end thereof; and
said lesser shrinkage of said another one member is sufficient to effect a restraining action by said plug on the shrinkage of said portion of said tubular body during said firing accompanied by the development of a bulged-out configuration in said portion of said tubular body.

7. The method of hermetically sealing directly together at least two polycrystalline ceramic bodies to form a monolithic structure wherein said bodies are formed of sinterable polycrystalline ceramic material and at least one of said bodies is a tubular body, said method comprising:
providing at least another one of said bodies having;
essentially the same coefficient of thermal expansion when sintered as that of said tubular body when sintered,
an external circumferential surface portion that closely fits an internal circumferential surface portion of said tubular body, and
a firing shrinkage substantially less than that of said tubular body to cause said surfaces to firmly and intimately contact each other with pressure developed therebetween when assembled in circumferentially contiguous telescoped relationship and when the so assembled members are fired to the sintering temperature of said material,
assembling directly together said members with said surfaces in said relationship; and
firing said assembled members to said temperature to effect sintering thereof with development of said shrinkage and of said resulting contact of said surfaces, and to contemporaneously effect sintering together of said contacting surfaces with development of a completely continuous crystal structure across and that replaces the former physical contact boundary therebetween.

8. An article of manufacture having a monolithic structure and comprising at least two polycrystalline ceramic members hermetically sinter-sealed directly together at an apparent circumferential boundary therebetween, all of said members having essentially the same coefficient of thermal expansion, at least one of said members being tubular, circumferential portion of said tubular member being embracive in circumferentially contiguous telescoped relationship of and constituting said boundary with at least a circumferential portion of at least one other of said members, and wherein said monolithic structure includes a completely continuous crystal structure across said boundary.

9. The article of claim 8 wherein said polycrystalline ceramic consists essentially of polycrystalline ceramic oxide.

10. The article of claim 9 wherein said oxide is alpha alumina.

11. The article of claim 8 wherein said one other member is a second tubular member with said portion thereof being axially adjacent to an end thereof and said portion of said first named tubular member is axially adjacent to an end thereof.

12. The article of claim 11 wherein said first named tubular member is a cap with said portion thereof being a tubular skirt.

13. The article of claim 8 wherein said one other member is a plug and said portion of said tubular member is axially adjacent to an end thereof.

14. An electric arc discharge lamp comprising
a. an envelope comprising:
   i. a tubular light-transmissive polycrystalline ceramic member,
   ii. a pair of apertured polycrystalline ceramic closure members closing opposite ends of said tubular member and being monolithically hermetically sinter-sealed directly thereto at an apparent circumferential boundary between said tubular member and each of said closure members,
   iii. all of said members having essentially the same coefficient of thermal expansion,
   iv. at each end of said tubular member, one of said tubular and closure members having a circumferential portion embracive in circumferentially contiguous telescoped relationship of and constituting said boundary with at least a circumferential portion of the other of said tubular and closure members, and
   v. a monolithic structure that includes a completely continuous crystal structure across said boundary,
b. at least a pair of electrodes contained within said envelope and mounted on hermetically sealed electrode support members;
c. said electrode support members positioned through each of said apertured closure members and hermetically sealed thereto
d. a charge of an inert ionizable starting gas and a vaporizable light-emitting substance within said envelope.

15. The electric arc discharge lamp of claim 14 in which the apertures of the apertured closure members are outwardly tapering in configuration and those portions of the electrode support members which are hermetically sealed to said apertured closure members are complementarily inwardly tapering in configuration.

16. The electric arc discharge lamp of claim 14 in which the polycrystalline ceramic consists essentially of polycrystalline ceramic oxide.

17. The electric arc discharge lamp of claim 14 in which the polycrystalline ceramic consists essentially of alumina.

18. The electrical arc discharge lamp of claim 14 in which the apertured closure members are in the form of caps having skirt members embracive of the ends of the tubular light-transmissive polycrystalline ceramic member.

19. The electrical arc discharge lamp of claim 14 in which the aperture apertured closure members are in the form of plugs positioned within the tubular light-transmissive polycrystalline ceramic member.

UNITED STATES PATENT OFFICE
CERTIFICATE OF CORRECTION

Patent No. __3,564,328__   Dated __February 16, 1971__

Inventor(s) __Rodney D. Bagley and Edwin J. Force__

It is certified that error appears in the above-identified patent and that said Letters Patent are hereby corrected as shown below:

Column 5, line 18, "1,00°C." should be --1,000°C.--.

Columns 5 and 6, Table I, vertical column of numbers "100' down through "8" listed under "Diameter,Microns" should be set forth under --Weight Percentage Under Size--.

Columns 5 and 6, Table I, "∞10" should be deleted as foreign matter.

Column 6, line 74, "or" should be --on--.

Column 7, line 71, "sealant" should be --Sealant--.

Signed and sealed this 22nd day of February 1972.

(SEAL)
Attest:

EDWARD M. FLETCHER, JR.
Attesting Officer

ROBERT GOTTSCHALK
Commissioner of Patents